United States Patent [19]

Platte

[11] 4,330,248
[45] May 18, 1982

[54] MOLD WITH ADJUSTABLE INSERTS

[76] Inventor: Richard L. Platte, 250 Sumac La., Ann Arbor, Mich. 48105

[21] Appl. No.: 187,609

[22] Filed: Sep. 15, 1980

[51] Int. Cl.³ .................................................. B29C 17/07
[52] U.S. Cl. ......................................... 425/183; 249/82; 249/102; 249/155; 249/157; 264/523; 425/186; 425/522; 425/525
[58] Field of Search .................... 425/183, 522–541, 425/186; 249/82, 102, 155, 157; 264/523

[56] References Cited

U.S. PATENT DOCUMENTS

| | | | |
|---|---|---|---|
| 3,136,001 | 6/1964 | Gelbard | 18/42 |
| 3,570,057 | 3/1971 | Doyle | 425/522 |
| 3,692,450 | 9/1972 | Feldman | 249/155 X |
| 4,047,692 | 9/1977 | Swin, Sr. | 249/142 |
| 4,151,976 | 5/1979 | Shurman | 425/522 X |

Primary Examiner—Jan H. Silbaugh
Attorney, Agent, or Firm—Beaman & Beaman

[57] ABSTRACT

A mold for blow molding synthetic plastic bottles and jugs wherein a depression is formed in the side of the container for volume regulating purposes. The mold incorporates an insert member within its side wall and cavity which is adjustably positionable with respect to its degree of extension into the mold cavity resulting in formation of a variable volume depression in the container wall. The mold inserts may take various forms and include means for locking the insert adjustment.

5 Claims, 9 Drawing Figures

MOLD WITH ADJUSTABLE INSERTS

BACKGROUND OF THE INVENTION

The volume of blow molded jugs, such as of the one gallon size, in which milk and similar beverages are commonly distributed in retail stores are often regulated by forming depressions in the jug side walls extending into the volume defined by the container material. Such depressions are molded into the container side wall by locating removable inserts within the mold. Depending upon the size of the depression desired an appropriate mold insert is mounted within the mold cavity, and such inserts are installed and removed manually, a time consuming and troublesome operation.

Also, depending on the nature of the beverage to be contained, and the bottling temperature thereof, it may be required that no volume regulating depression be formed in the jug side wall, and it is necessary to stop container production and modify the mold by the addition and removal of inserts to produce the container form desired.

It is an object of the invention to provide a mold for blow molding containers of synthetic plastic material wherein the mold cavity side wall includes adjustable inserts for forming volume regulating depressions within the molded container.

A further object of the invention is to provide a mold for blow molding synthetic plastic containers wherein removable depression forming inserts mounted in the mold cavity side wall are readily adjustable and include means for locking the insert relative to the mold side wall.

An additional object of the invention is to provide an adjustable insert for molds utilized in blow molding containers wherein the volume of the insert located within the mold cavity is readily and accurately adjustable exteriorly of the mold, and wherein the insert configuration is such as to avoid weakening the formed container.

In the practice of the invention a recess is formed in the side wall of a mold employed to blow mold synthetic plastic containers, such as one gallon jugs used in the retail packaging of milk. An insert member is movably mounted within this recess, and in the two embodiments illustrated, the insert member may have a longitudinal screw adjusted movement, or may consist of a rotatable member of noncircular cross-sectional configuration. The insert member is either longitudinally or rotatably adjustable within its mold side wall recess wherein a variable mass of the insert is adjustably positioned within the mold cavity resulting in a depression defined in the side wall of the molded container.

Locking means are associated with the insert member whereby the relative adjusted position of the member to the mold will be maintained during successive cycles, and as the insert member is exteriorly adjusted variations in the volume of the depressions formed in the molded container by the insert may be readily produced.

The insert may be of such configuration as to conform to the normal shape of the mold cavity wherein no insert portion is located within the cavity and the molded container is free of volume adjusting depressions.

BRIEF DESCRIPTION OF THE DRAWINGS

The aforementioned objects and advantages of the invention will be appreciated from the following description and and accompanying drawings wherein.

DESCRIPTION OF THE PREFERRED EMBODIMENTS

Figure 1:
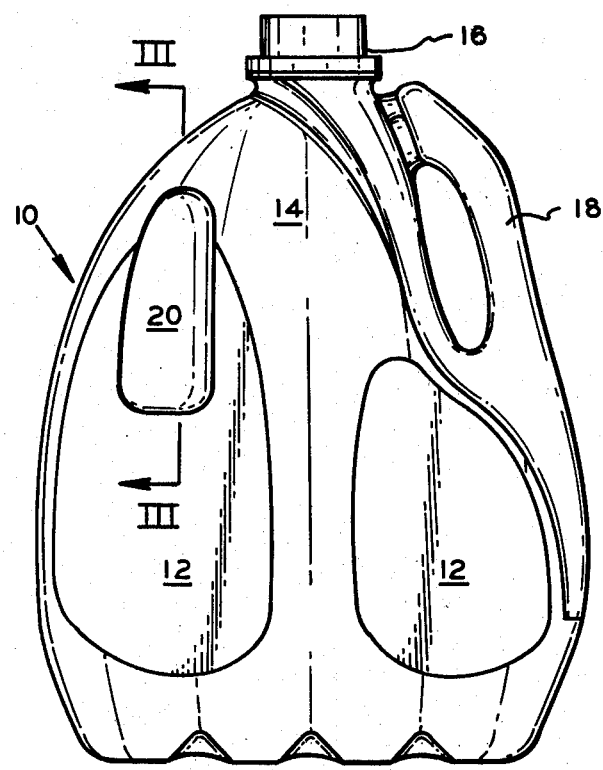
FIG. 1 is an elevational view of a blow molded synthetic jug of the type formed in a mold constructed in accord with the invention.
Figure 3:
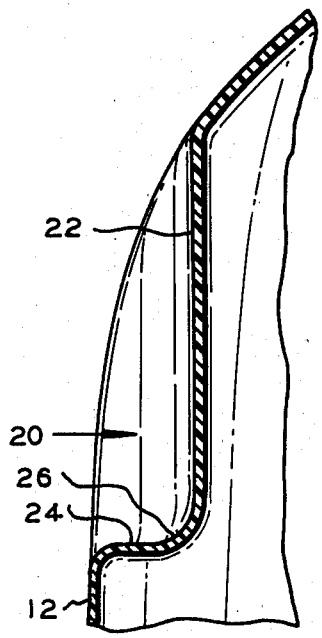
FIG. 3 is an enlarged, detail, elevational sectional view of a jug volume regulating depression as taken along Section III—III of FIG. 1.
Figure 2:
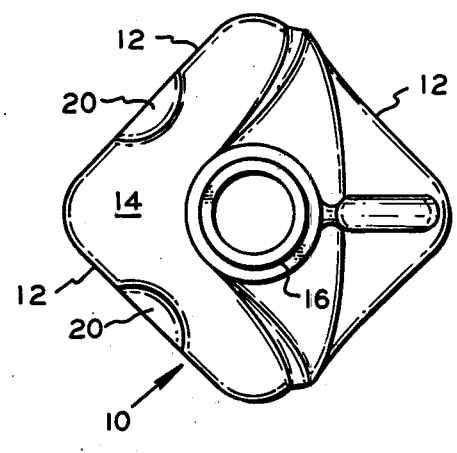
FIG. 2 is a top plan view of the jug of FIG. 1.

A liquid container of the type with which the mold of the invention is employed to form is shown in FIGS. 1-3. The container is of a synthetic thermoplastic material which is formed by heating a synthetic plastic parison and inflating such material within a mold whereby the material is confined by the mold cavity and assumes the configuration of the cavity. The illustrated container is of the form used for the retail sale of milk comprising a one gallon jug 10 having a generally rectangular plan form, FIG. 2, including substantially flat side wall portions 12 interconnected at rounded corners, merging with convex upper portions 14 extending to the neck 16. A hollow handle portion 18 is homogeneously molded into the body and an opening is defined between the handle portion and the main body.

While the jug 10 is dimensioned to contain a predetermined volume of liquid, the temperature of the liquid during filling of the jug, or shrinkage of the jug after being blown, will affect the liquid volume contained, and as it is economically necessary to dimension the mold to produce a single size of jug regardless of the temperature of the liquid that will be placed therein or whether the jug will be immediately filled or later filled, and as it is desired that the liquid within the jug substantially fill the container it is known to form volume regulating depressions in the side wall of the jug to control the volume thereof in accordance with the temperature of the liquid during filling or to compensate for jug shrinkage in jugs filled 48 hours or more after being blown.

In prior art devices, such volume regulating depressions are usually of a conical truncated form located within the jug side wall, and these depressions are produced by truncated inserts removably affixed within the mold cavity, being mounted upon the mold cavity side walls. The size of the truncated inserts varied in accord with the degree of volume adjustment desired, and the replacement and changing of such inserts within the mold cavity is manually accomplished and is time consuming.

In the practice of the invention volume adjusting depressions 20 are formed in the side walls of the jug 10, and such depressions are of an elongated form including a cylindrical segment surface 22, a lower surface 24, and a concave radiused surface 26 merging surfaces 22 and 24. The length of the surface 22 will determine the volume of the depression formed in the jug, a shorter length resulting in a smaller volume displacement within the jug volume, and a larger dimension resulting in a larger volume displacement.

Figure 4:
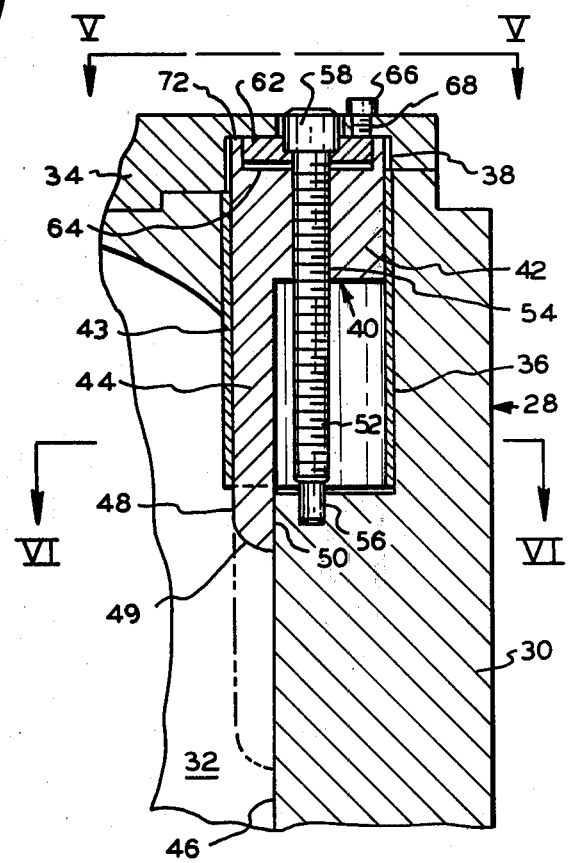
FIG. 4 is a detail, elevational, sectional view of a mold side wall illustrating an adjustable insert in accord with the invention located therein.

The mold 28 in which the jug 10 is formed is partially shown in FIG. 4, and the mold consists of side walls 30 defining a mold cavity 32, and the upper portion of the mold is defined by neck ring 34 removably attached to the side walls 30 by bolts or screws, not shown. The construction of the mold 28 and side walls 30, except for the details hereinafter described relative to the insert, are conventional, and the particular configuration of the mold side walls and cavity, other than the volume regulating insert member, form no part of the inventive concepts.

With reference to FIG. 4, a cylindrical recess 36 is defined within side wall 30, and is of such diameter and location that the plan extension thereof extends into the cavity 32. The neck ring 34 is recessed at 38 forming an extension of the cylindrical recess 36, and a volume control insert slide member 40 is mounted within the side wall recess 36 for movement therein.

Figure 6:
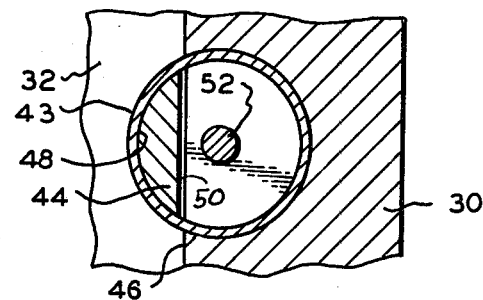
FIG. 6 is a plan, sectional view of the insert member of FIG. 4 as taken along Section VI—VI thereof.

The insert member 40 includes an upper portion 42 of cylindrical configuration slidably received within sleeve 43 of cylindrical annular form which lines the surface of the recess 36. The lower two thirds of the insert member 40 comprises a tongue 44 in alignment with the cavity side wall surface 46, and of a cross-sectional configuration apparent in FIG. 6 which includes a cylindrical segment exterior surface 48 and a convex nose 49, and a planar surface 50 disposed adjacent the mold side wall 46.

An elongated screw 52 extends through a threaded hole 54 defined in the insert member portion 42, and the lower end of the screw, FIG. 4, is rotatably received within a bearing socket 56 defined in the mold side wall. The upper end of the screw 52 includes a head 58 having a hexagonal Allen wrench receiving socket 60 defined thereon, and radially extending flange 62 is affixed to the head 58 and is located within concentric recess 64 defined in the upper end of the insert member portion 42.

Figure 5:
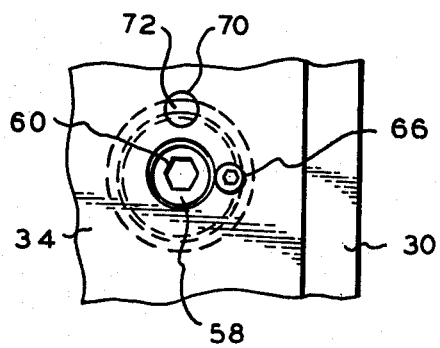
FIG. 5 is a top plan view as taken along Section V—V of FIG. 4.

The upper end of the head 58 is exteriorly accessible, as will be appreciated from the plan view of FIG. 5, and it will be appreciated that rotation of the screw 52 will adjust the insert member 40 between the retracted position shown in full lines in FIG. 4 to the fully extended position shown in dotted lines.

A lock screw 66 is threaded within hole 68 defined in the neck ring 34 in alignment with the flange 62, and the lock screw includes a head and hexagonal socket for receiving an Allen wrench. Further, a calibration access hole 70 is formed in the neck ring 34 in alignment with the upper edge 72 of the insert member 40 wherein the location of the insert member will be accurately determined by inserting a measuring probe through the access hole 70 for engagement with the member edge 72.

It will be appreciated that the insert member tongue 44 will extend into the mold cavity 32 to the extent desired as produced by rotation of the screw 52, and as measured through calibration access hole 70. The configuration of the tongue 44 is such as to form a volume adjusting depression 20 within the jug side wall, i.e. surface 48 will form depression surface 22 and nose 49 will form surface 24 and radius 26, and the volume of the depression 20 formed is easily varied by operation of the screw 52. Of course, if it is desired that two depressions 20 be formed in the jug side walls as shown in the drawings, two of the mold side walls 30 will include the structure shown in FIG. 4.

Figure 7:
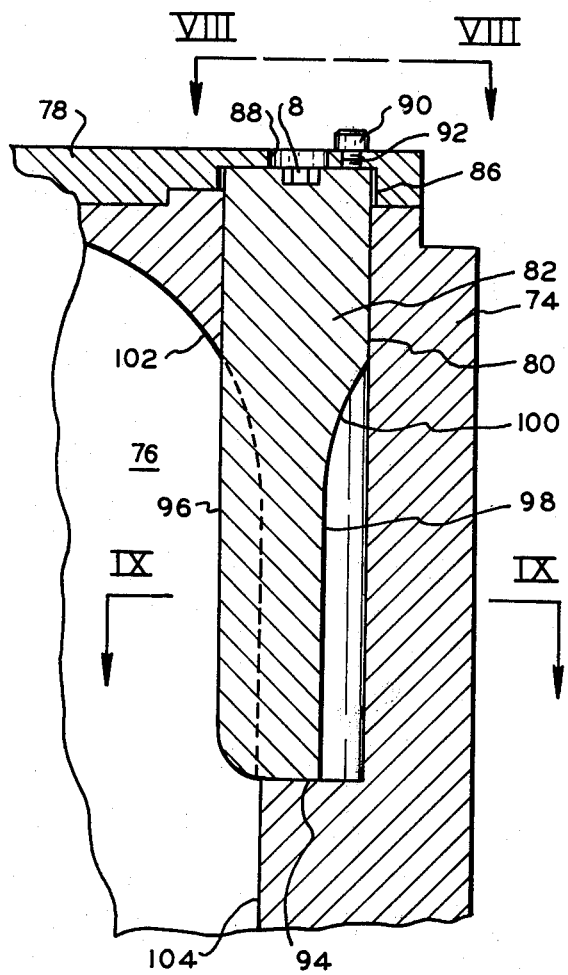
FIG. 7 is a detail, elevational, sectional view of another embodiment of insert as mounted in the side wall of a mold embodying the inventive concepts.
Figure 8:
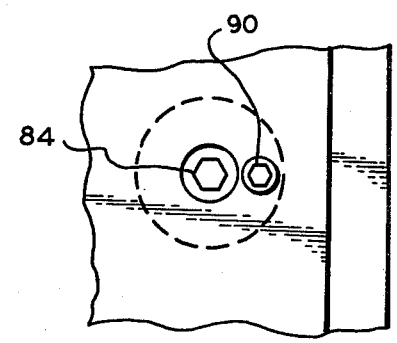
FIG. 8 is a top plan view of the embodiment of FIG. 7 as taken along Section VIII—VIII thereof.
Figure 9:
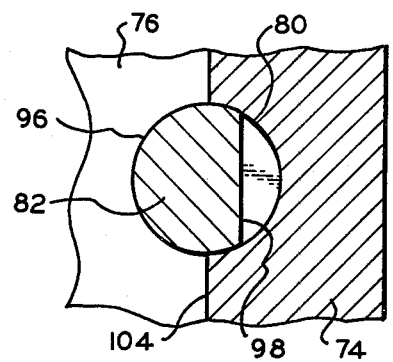
FIG. 9 is a plan, detailed sectional view as taken along Section IX—IX of FIG. 7.

A variation of a jug volume control insert member is shown in FIGS. 7-9 wherein the mold side wall 74 defines a mold cavity 76 which is enclosed at its upper end by the neck ring 78 removably mounted thereon by bolts, not shown.

In this embodiment a cylindrical recess 80 is defined in the mold body side wall, and the diameter of the recess is such as to project into the cavity 76. The insert member 82 is of a generally cylindrical configuration and is rotatively received within the recess 80. The upper end of the member 82 includes a hexagonal socket 84 for receiving an Allen wrench, and the neck ring is recessed at 86 and includes opening 88, whereby the member 82 may be exteriorally rotated.

A locking screw 90 threaded within neck ring bore 92, and including an Allen wrench receiving head, will engage the upper surface of insert member 82 for locking the member against rotation, tightening of the screw 90 forcing the member lower end against the recess bottom surface 94.

The cross-sectional configuration of the member 82 will be appreciated from FIG. 9, the major portion of the member exterior surface comprising cylindrical surface 96, and the surface 98 being of a generally planar configuration and including concave surface 100 which, when aligned with the mold cavity surface 102 constitutes a continuation thereof. When the insert member 82 is in the position shown in full lines in FIG. 7 the member cylindrical surface 96 extends into the cavity 76 and will form a volume control depression 20 in the jug 10 as the jug is molded.

If the insert member 82 is rotated 180° from the position shown in FIG. 9 the surface 100 will align with the mold surface 102, and the surface 98 will align with the cavity surface 104, as shown in dotted lines in FIG. 7, and the member 82 will occupy none of the molded cavity 76. Thus, with the member 82 so positioned a jug molded within cavity 76 will not contain any volume control depressions, and this adjustment of the member 82 is employed in those instances wherein jug volume control is not desired.

It will be readily appreciated that the disclosed embodiments of the inventive concepts permit blow molding molds to be quickly modified to produce variable volume container depressions, and as the mold insert members are externally adjustable the size of the container depressions are readily varied with a minimum of skill and in a minimum duration of time.

It is appreciated that various modifications to the inventive concepts may be apparent to those skilled in the art without departing from the spirit and scope of the invention.

I claim:

1. In a mold for blow molding synthetic plastic jugs wherein the jugs include side walls selectively having volume adjusting depressions defined therein, the mold including a cavity formed by side walls defining the jug side walls and a neck ring mounted upon the mold side walls, the improvement comprising, an elongated depression formable sleeve mounted on a mold side wall having a convex surface disposed toward the mold cavity and an open end, means mounting an elongated insert member upon the mold side wall within said sleeve for selective projection from the sleeve end into the mold cavity and positioning relative to the mold side wall, said insert member having an exterior convex configuration for selective positioning within the mold cavity wherein movement of said insert member relative to the associated mold side wall selectively projects a variable volume of mass into the mold cavity, said insert member forming a jug volume adjusting depression in the molded jug side wall, the dimensions of the jug depression being determined by the relative adjustment of said insert member to the associated mold side wall and sleeve, adjustment means operatively associated with said depression formable insert member for selectively adjusting said insert member relative to its associated mold side wall, and locking means mounted on the mold selectively locking said insert member at a predetermined position of adjustment.

2. In a mold as in claim 1, said adjustment means comprising a rotatable screw extending parallel to the insert member length and threadedly engaging said insert member, restraining means defined on the mold restraining said screw against axial displacement, exteriorly accessible screw drive means defined on said screw for rotating said screw whereby screw rotation positions said insert member relative to the mold cavity, said locking means selectively locking said screw against rotation.

3. In a mold as in claim 2 wherein said screw includes a flange defined thereon and said locking means comprises a lock screw received within a threaded hole defined in the mold selectively engagable with said flange.

4. In a mold for blow molding synthetic plastic jugs wherein the jugs include side walls selectively having volume adjusting depressions defined therein, the mold including a cavity formed by side walls defining the jug side walls and a neck ring mounted upon the mold side walls, the improvement comprising, an elongated depression formable member mounted on a mold side wall having a longitudinal axis, said member having an exterior surface including a first substantially cylindrical portion and a second portion substantially corresponding to the normal mold cavity side wall configuration, a recess defined in the mold side wall rotatably receiving said member, and drive means defined upon said member for selectively rotating said member within said recess selectively exposing said first or second exterior surface portions to the mold cavity, exposure of said first surface portion forming a depression in the jug side wall being molded.

5. In a mold as in claim 4, a locking screw within a threaded bore defined in the mold, said locking screw being aligned with said member for selective engagement therewith locking said member against rotation.

* * * * *